UNITED STATES PATENT OFFICE.

HEINRICH AUGUST BERNTHSEN, OF MANNHEIM, GERMANY, ASSIGNOR TO BADISCHE ANILIN & SODA FABRIK, OF LUDWIGSHAFEN-ON-THE-RHINE, GERMANY, A CORPORATION.

RHODAMIN DYE AND PROCESS OF MAKING SAME.

No. 821,452.          Specification of Letters Patent.          Patented May 22, 1906.

Application filed November 8, 1904. Serial No. 231,906. (Specimens.)

*To all whom it may concern:*

Be it known that I, HEINRICH AUGUST BERNTHSEN, doctor of philosophy, a subject of the King of Prussia, German Emperor, residing at Mannheim, in the Grand Duchy of Baden, in the German Empire, have invented new and useful Improvements in Rhodamin Coloring-Matter and Processes of Producing the Same, of which the following is a specification.

All attempts made up to the present time to produce a monoalkylated rhodamin intermediate product—that is, a monoalkyl-amido-hydroxy-benzoyl-benzoic acid—by condensing together equal molecular proportions of phthalic anhydrid and a monoalkyl-meta-amido-phenol have failed because the free hydrogen atom of the amido group takes part in the condensation and a different product is obtained from that desired. I have now discovered a method by which these intermediate products can be obtained—namely, by condensing together equal molecular proportions of phthalimid and a monoalkyl-meta-amido-phenol in the presence of boric acid and then saponifying by means of caustic alkali or otherwise the new monoalkyl-amido-hydroxy-benzoyl-benzamid so obtained. With the help of these new intermediate products I am enabled to manufacture new rhodamin coloring-matters of which the most important are the monoalkyl-rhodamins made by condensing the new intermediate product with a molecular proportion of meta-amido-phenol, and these may either be used as such or they may be converted into their esters by suitable esterifying means. For instance, they may be heated with alcohol and sulfuric acid. The new rhodamins yield more yellowish shades of red than any of the dyes of this series hitherto known in commerce, and they therefore constitute a valuable new class of coloring-matters. They are soluble in water, giving red fluorescent solutions. If the solutions of the unesterified rhodamins containing one part in one thousand parts of water be allowed to stand, a precipitate forms, while the solution of the esters remains clear. On treatment with hydrochloric acid and a nitrite the unesterified rhodamin solutions become colorless, or nearly so, and on pouring into an alkaline beta-naphthol solution an orange or brownish color is developed. Under the same treatment the esters do not become decolorized and on addition to beta-naphthol solution produce a dark precipitate. The other new coloring-matters obtainable according to my invention are those produced by combining the new monoalkylated intermediate product with a different monoalkyl-meta-amido-phenol from that which was employed in the production of the said intermediate product.

The rhodamins produced according to my invention may be used as such or they may be employed in the form of their esters, and I wish to be understood as claiming these new rhodamins both in the form in which they contain a free carboxyl group and in the form of their hydrochloric-acid salts have the composition corresponding to the formula

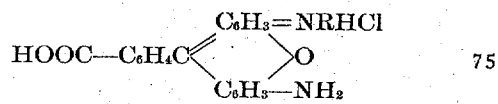

and also in the form in which the carboxyl group has been esterified, in which case their hydrochloric-acid salts have the composition corresponding to the formula

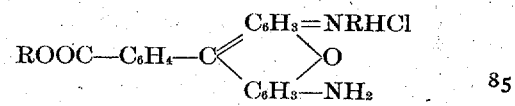

in both of which formulæ R represents an alkyl group.

Of course in every case instead of the meta-amido-phenol or monoalkyl-meta-amido-for instance, as para-methyl-meta-amido-phenol homologues of these compounds—such, phenol (generally known as "ortho-amido-para-cresol") and para-methyl- monoalkyl-meta-amido-phenol (generally known as "ortho-alkyl-amido-para-cresol")—may be used without departing from the nature of my invention, provided that in these compounds the para position to the amido group or substituted amido group is only occupied by hydrogen, and this of course effects a corresponding alteration in the composition of the coloring-matters.

The following examples will serve to further illustrate the nature of my invention, which, however, is not confined to these examples. The parts are by weight.

*Example 1 — Production of monoethyl-amido-hydroxy-benzoyl-benzoic acid.*—Stir well together one hundred and forty-seven (147) parts of phthalimid, one hundred and thirty-seven (137) parts of monoethyl-meta-amido-phenol, and one hundred and thirty (130) parts of crystallized boric acid and then heat the whole for about three (3) hours, while stirring, at a temperature of from one hundred and fifty to one hundred and sixty degrees centigrade. (150–160° C.) After cooling break up the melt into a coarse powder and boil this with three thousand (3,000) parts of water and six hundred and ninety (690) parts of caustic-soda solution containing about thirty-five (35) per cent. of NaOH until the evolution of ammonia ceases. Then filter and while cooling somewhat by means of ice add hydrochloric acid until the mixture just becomes acid when tested with Congo paper. The substituted benzoic acid which separates out can be filtered off, washed with water, pressed, and dried.

*Example 2—Production of monoethyl-rhodamin.*—Introduce ninety-six (96) parts of monoethyl-amido-hydroxy-benzoyl-benzoic-acid hydrochlorid into one thousand (1,000) parts of sulfuric acid containing about ninety-six (96) per cent. of $H_2SO_4$ at ordinary temperature and after solution is effected add slowly forty-five (45) parts of acetyl-meta-amido-phenol and then stir the mixture for about six (6) hours at a temperature of from twenty to thirty degrees centigrade, (20–30° C.) Then pour the melt into ten thousand (10,000) parts of water, boil the whole for three (3) hours, and then precipitate the coloring-matter from this solution by means of common salt.

If it be desired to purify the coloring-matter, rub it with a little water and two hundred (200) parts of caustic-soda solution containing about thirty-five (35) per cent. of NaOH and then dilute the mixture with six thousand (6,000) parts of water. Allow to stand for a considerable time, filter off the rhodamin base, and reconvert it in the usual manner into its hydrochlorid.

*Example 3—Production of monoethyl-homo-rhodamin.*—Introduce at ordinary temperature ninety-six (96) parts of monoethyl-amido-hydroxy-benzoyl-benzoic-acid hydrochlorid into one thousand (1,000) parts of sulfuric acid containing about ninety-six (96) per cent. of $H_2SO_4$ and after solution is effected add slowly forty (40) parts of para-methyl-meta-amido-phenol, (generally known as "ortho-amido-para-cresol.") Allow the melt to stand over night, pour into water, and make slightly alkaline by means of caustic soda. After allowing to stand for a considerable time filter off the rhodamin base and convert this in the usual manner into its hydrochlorid.

*Example 4—Production of monoethyl-rhodamin ester.*—Mix together twenty (20) parts of monoethyl-rhodamin hydrochlorid, one hundred and sixty (160) parts of alcohol, and thirty (30) parts of sulfuric acid containing about ninety-six (96) per cent. of $H_2SO_4$, and boil the whole gently on the water-bath for from eight to ten (8–10) hours. Then distil off the excess of alcohol, pour the residue into water, add a little hydrochloric acid, and salt out the coloring-matter by means of common salt.

If it be desired to obtain the ester free from any unesterified rhodamin, dissolve the residue obtained after distilling off the alcohol in twenty thousand (20,000) parts of hot water and add twenty (20) parts of Rochelle salt. Allow to stand over night and filter off the unesterified rhodamin base and to the filtrate add a little hydrochloric acid and precipitate the rhodamin ester by means of common salt.

Instead of esterifying by means of alcohol and sulfuric acid in the manner described in this example any other known method of esterifying rhodamins may be employed—for instance, the methods described in the specifications of Letters Patents Nos. 499,927 and 516,584.

Now what I claim is—

1. The process for the production of rhodamin coloring-matters which consists in condensing phthalimid with a monoalkyl-meta-amido-phenol, saponifying the benzamid obtained and condensing the resulting product with a meta-amido-phenol.

2. The process for the production of rhodamin coloring-matters which consists in condensing phthalimid with a monoalkyl-meta-amido-phenol, saponifying the benzamid obtained, condensing the resulting product with a meta-amido-phenol, and esterifying the resulting condensation product.

3. The process for the production of rhodamin coloring-matters which consists in condensing phthalimid with a monoalkyl-meta-amido-phenol, saponifying the benzamid obtained, and condensing the resulting product with para-methyl-meta-amido-phenol.

4. The process for the production of rhodamin coloring-matters which consists in condensing phthalimid with a monoalkyl-meta-amido-phenol, saponifying the benzamid obtained, condensing the resulting product with para-methyl-meta-amido-phenol, and esterifying the resulting condensation product.

5. The process for the production of rhodamin coloring-matters which consists in condensing phthalimid with monoethyl-meta-amido-phenol, saponifying the benzamid obtained, and condensing the resulting product with para-methyl-meta-amido-phenol.

6. The process for the production of rhodamin coloring-matters which consists in condensing phthalimid with a monoethyl-meta-amido-phenol, saponifying the benzamid obtained, condensing the resulting product with para-methyl-meta-amido-phenol and esterifying the resulting condensation product.

7. As new articles of manufacture the rhodamin coloring-matters obtainable by condensing a monoalkyl-rhodamin intermediate product with a meta-amido-phenol, which coloring-matters produce yellower shades of red than the rhodamins hitherto known in commerce, and in which only one hydrogen atom of the amido groups is substituted by an alkyl group.

8. As a new article of manufacture the rhodamin coloring-matter obtainable by condensing monoethyl-meta-amido-hydroxy-benzoyl-benzoic acid with para-methyl-meta-amido-phenol, which coloring-matter produces yellower shades of red than the rhodamins hitherto known in commerce, and in which only one hydrogen atom of the amido groups is substituted by an ethyl group, and which upon treatment with hydrochloric acid and a nitrite yields a colorless solution, or nearly so, which on pouring into an alkaline beta-naphthol solution produces an orange color, and which coloring-matter in the form of its hydrochloric-acid salt has the composition corresponding to the formula

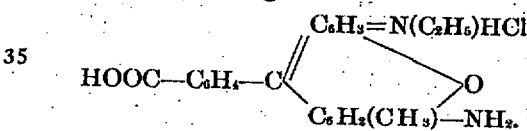

9. As new articles of manufacture the rhodamin coloring-matters obtainable by condensing a monoalkyl-rhodamin intermediate product with a meta-amido-phenol and esterifying the condensation product, which coloring-matters are completely soluble in cold water and which produce yellower shades of red than the rhodamins hitherto known in commerce, and in which only one hydrogen atom of the amido groups is substituted by an alkyl group.

10. As a new article of manufacture the rhodamin coloring-matter obtainable by condensing monoethyl-meta-amido-hydroxy-benzoyl-benzoic acid with para-methyl-meta-amido-phenol and esterifying the condensation product, which coloring-matter produces yellower shades of red than the rhodamins hitherto known in commerce, and in which only one hydrogen atom of the amido groups is substituted by an ethyl group, and which upon treatment with hydrochloric acid and a nitrite yields a red solution which on pouring into an alkaline beta-naphthol solution produces a dark precipitate and which in the form of its hydrochloric-acid salt has the composition corresponding to the formula

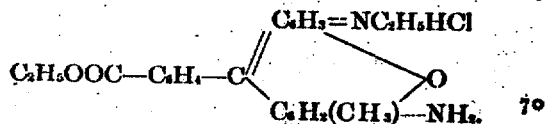

In testimony whereof I have hereunto set my hand in the presence of two subscribing witnesses.

HEINRICH AUGUST BERNTHSEN.

Witnesses:
A. REUTLINGER,
JOS. H. SEUTE.

---

It is hereby certified that in Letters Patent No. 821,452, granted May 22, 1906, upon the application of Heinrich August Bernthsen, of Mannheim, Germany, for an improvement in "Rhodamin Dyes and Processes of Making Same," an error appears in the printed specification requiring correction, as follows: On page 1, lines 91 to 93 should read *phenol, homologues of these compounds—such, for instance, as para-methyl-meta-amido-phenol;* and that the said Letters Patent should be read with this correction therein that the same may conform to the record of the case in the Patent Office.

Signed and sealed this 17th day of July, A. D., 1906.

[SEAL.]

E. B. MOORE,
*Acting Commissioner of Patents.* amin coloring-matters which consists in condensing phthalimid with a monoethyl-meta-amido-phenol, saponifying the benzamid obtained, condensing the resulting product with para-methyl-meta-amido-phenol and esterifying the resulting condensation product.

7. As new articles of manufacture the rhodamin coloring-matters obtainable by condensing a monoalkyl-rhodamin intermediate product with a meta-amido-phenol, which coloring-matters produce yellower shades of red than the rhodamins hitherto known in commerce, and in which only one hydrogen atom of the amido groups is substituted by an alkyl group.

8. As a new article of manufacture the rhodamin coloring-matter obtainable by condensing monoethyl-meta-amido-hydroxy-benzoyl-benzoic acid with para-methyl-meta-amido-phenol, which coloring-matter produces yellower shades of red than the rhodamins hitherto known in commerce, and in which only one hydrogen atom of the amido groups is substituted by an ethyl group, and which upon treatment with hydrochloric acid and a nitrite yields a colorless solution, or nearly so, which on pouring into an alkaline beta-naphthol solution produces an orange color, and which coloring-matter in the form of its hydrochloric-acid salt has the composition corresponding to the formula

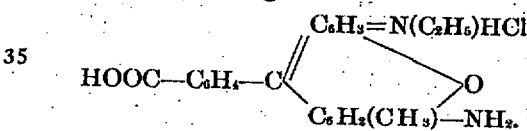

9. As new articles of manufacture the rhodamin coloring-matters obtainable by condensing a monoalkyl-rhodamin intermediate product with a meta-amido-phenol and esterifying the condensation product, which coloring-matters are completely soluble in cold water and which produce yellower shades of red than the rhodamins hitherto known in commerce, and in which only one hydrogen atom of the amido groups is substituted by an alkyl group.

10. As a new article of manufacture the rhodamin coloring-matter obtainable by condensing monoethyl-meta-amido-hydroxy-benzoyl-benzoic acid with para-methyl-meta-amido-phenol and esterifying the condensation product, which coloring-matter produces yellower shades of red than the rhodamins hitherto known in commerce, and in which only one hydrogen atom of the amido groups is substituted by an ethyl group, and which upon treatment with hydrochloric acid and a nitrite yields a red solution which on pouring into an alkaline beta-naphthol solution produces a dark precipitate and which in the form of its hydrochloric-acid salt has the composition corresponding to the formula

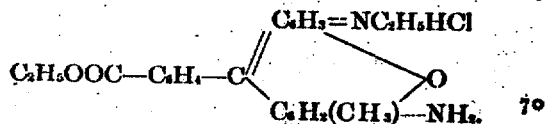

In testimony whereof I have hereunto set my hand in the presence of two subscribing witnesses.

HEINRICH AUGUST BERNTHSEN.

Witnesses:
A. REUTLINGER,
JOS. H. SEUTE.

---

It is hereby certified that in Letters Patent No. 821,452, granted May 22, 1906, upon the application of Heinrich August Bernthsen, of Mannheim, Germany, for an improvement in "Rhodamin Dyes and Processes of Making Same," an error appears in the printed specification requiring correction, as follows: On page 1, lines 91 to 93 should read *phenol, homologues of these compounds—such, for instance, as para-methyl-meta-amido-phenol;* and that the said Letters Patent should be read with this correction therein that the same may conform to the record of the case in the Patent Office.

Signed and sealed this 17th day of July, A. D., 1906.

[SEAL.]

E. B. MOORE,
*Acting Commissioner of Patents.*

It is hereby certified that in Letters Patent No. 821,452, granted May 22, 1906, upon the application of Heinrich August Bernthsen, of Mannheim, Germany, for an improvement in "Rhodamin Dyes and Processes of Making Same," an error appears in the printed specification requiring correction, as follows: On page 1, lines 91 to 93 should read *phenol, homologues of these compounds—such, for instance, as para-methyl-meta-amido-phenol;* and that the said Letters Patent should be read with this correction therein that the same may conform to the record of the case in the Patent Office.

Signed and sealed this 17th day of July, A. D., 1906.

[SEAL.]

E. B. MOORE,
*Acting Commissioner of Patents.*